US008761711B2

(12) United States Patent
Grignani et al.

(10) Patent No.: US 8,761,711 B2
(45) Date of Patent: Jun. 24, 2014

(54) PRE-LOADING DATA

(75) Inventors: Raphael Grignani, Woodland Hills, CA (US); Jan Chipchase, Setagama Ku (JP)

(73) Assignee: Core Wireless Licensing S.a.r.l, Luxembourg (LU)

( * ) Notice: Subject to any disclaimer, the term of this patent is extended or adjusted under 35 U.S.C. 154(b) by 1057 days.

(21) Appl. No.: 11/664,411

(22) PCT Filed: Sep. 30, 2005

(86) PCT No.: PCT/IB2005/002936
§ 371 (c)(1),
(2), (4) Date: Aug. 7, 2007

(87) PCT Pub. No.: WO2006/038087
PCT Pub. Date: Apr. 13, 2006

(65) Prior Publication Data
US 2008/0263344 A1 Oct. 23, 2008

(30) Foreign Application Priority Data
Oct. 1, 2004 (EP) .................................... 04256083

(51) Int. Cl.
*H04B 1/16* (2006.01)
(52) U.S. Cl.
USPC ..................... 455/343.4; 455/127.5; 455/574; 719/318; 713/320; 713/324
(58) Field of Classification Search
USPC ............... 455/343.1–343.6, 127.5, 572–574; 719/318; 713/320, 324; 342/357.08
See application file for complete search history.

(56) References Cited

U.S. PATENT DOCUMENTS

| 5,321,828 A * | 6/1994 | Phillips et al. .................. 703/28 |
| 5,809,327 A * | 9/1998 | Wollan et al. ................... 712/33 |
| 6,052,779 A | 4/2000 | Jackson et al. |
| 6,189,106 B1 * | 2/2001 | Anderson ..................... 713/300 |

(Continued)

FOREIGN PATENT DOCUMENTS

| CN | 1359069 A | 7/2002 |
| GB | 2372587 A | 8/2002 |
| GB | 2372587 B | 6/2005 |
| WO | 03/056791 | 7/2003 |

OTHER PUBLICATIONS

Chinese Office Action application No. 200580032735.1 dated Feb. 12, 2010.

(Continued)

*Primary Examiner* — Edward Urban
*Assistant Examiner* — Rui Hu
(74) *Attorney, Agent, or Firm* — Ziegler IP Law Group

(57) ABSTRACT

A battery-powered device comprising: a memory storing software essential to the provision of normal functions of the device; a first processing section (16) comprising a data processor capable of executing the software, the device being capable of operating the first processing section in a normal mode in which it can execute the software and a low power mode; a second processing section (5) having a clock (6) for maintaining a time, and being capable of triggering behavior of the device in response to the time of the clock preceding a user-set time by a pre-set advance interval; the device being configured to, in response to triggering by the second processing section when the first processing section is in the low power mode, cause the first processing section to enter the normal mode and to load the software.

19 Claims, 1 Drawing Sheet

(56) References Cited

U.S. PATENT DOCUMENTS

| | | | |
|---|---|---|---|
| 6,457,132 B1* | 9/2002 | Borgendale et al. | 713/320 |
| 6,501,969 B1* | 12/2002 | Cannon et al. | 455/574 |
| 6,631,469 B1* | 10/2003 | Silvester | 713/2 |
| 6,654,895 B1* | 11/2003 | Henkhaus et al. | 713/320 |
| 7,164,935 B2* | 1/2007 | Naka et al. | 455/565 |
| 7,424,623 B2* | 9/2008 | Du et al. | 713/300 |
| 7,505,795 B1* | 3/2009 | Lim et al. | 455/574 |
| 7,685,606 B2* | 3/2010 | Chang | 719/318 |
| 7,725,903 B2* | 5/2010 | Kamiya et al. | 719/318 |
| 2001/0029178 A1 | 10/2001 | Criss et al. | |
| 2002/0078393 A1* | 6/2002 | Parker | 713/324 |
| 2002/0106997 A1* | 8/2002 | Barber et al. | 455/343 |
| 2002/0124165 A1 | 9/2002 | Smith et al. | |
| 2002/0174371 A1* | 11/2002 | Padawer et al. | 713/320 |
| 2003/0087679 A1* | 5/2003 | Naka et al. | 455/574 |
| 2003/0090236 A1* | 5/2003 | Odaohhara et al. | 320/134 |
| 2005/0022182 A1* | 1/2005 | Mittal | 717/178 |
| 2005/0113151 A1* | 5/2005 | Burke et al. | 455/574 |
| 2005/0120255 A1* | 6/2005 | Padawer et al. | 713/320 |
| 2006/0194624 A1* | 8/2006 | Hsieh et al. | 455/574 |
| 2007/0037610 A1* | 2/2007 | Logan | 455/574 |
| 2007/0213028 A1* | 9/2007 | Shohara et al. | 455/343.1 |

OTHER PUBLICATIONS

Chinese Office Action, Chinese Patent Application No. 200580032735.1, Date of Notification: Aug. 10, 2010, pp. 1-4, English Translation: pp. 1-6.

Chinese Office Action dated Jun. 8, 2011 corresponding to Chinese Application No. 200580032735.1, pp. 1-5, English Translation: pp. 1-7.

* cited by examiner

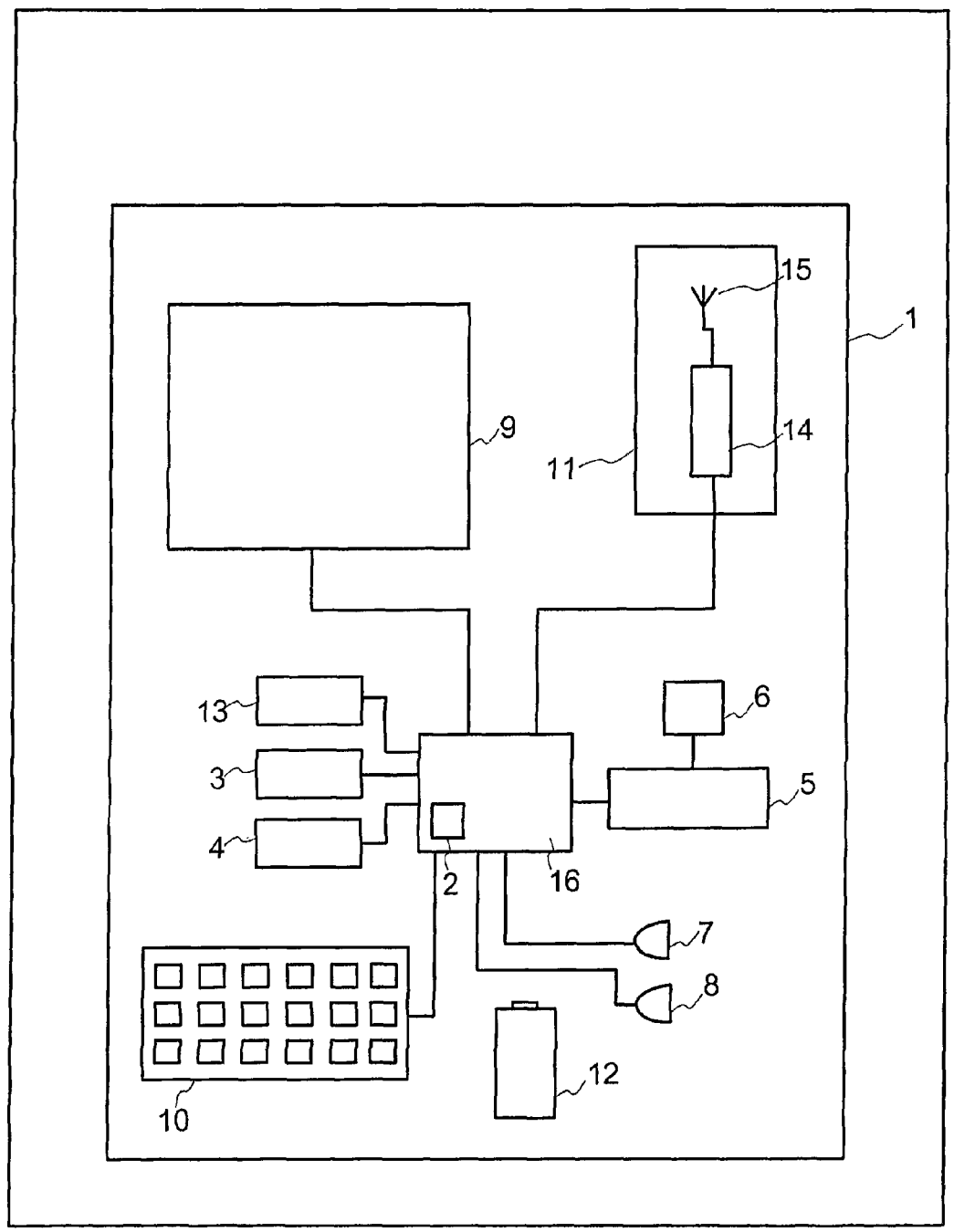

PRE-LOADING DATA

BACKGROUND

This invention relates to pre-loading of data.

As mobile phones and other handheld electronic devices become increasingly sophisticated it is taking longer for them to reach an operational state after they have been turned on. Modern mobile phones can take over a minute to boot up. The reason for this is that the devices' operating systems, including the essential software that the devices require to reach an operational state, are becoming more sophisticated and require longer to load from non-volatile memory into working memory and to place the variables and other settings used by the devices during operation into an operational configuration. This is a problem because users would prefer to be able to use a device as soon as possible after they turn it on.

One solution to this problem is for users to leave a device powered on all the time, either in a fully operational mode, or in a suspended mode in which the processor is substantially disabled but the working memory is still powered. However, in the case of battery-powered devices this uses up battery power and reduces the time that the device can be used before charging. Also, some users prefer to turn their devices off entirely, so that it does not disturb them, for example by ringing if it is a mobile phone.

Another solution is for the device to provide a hibernation mode in which the content of working memory is cached to non-volatile memory when the device is powered down. Then, when the device is powered up the cached data can be retrieved and the device can be returned relatively quickly to its operational state. This is useful in devices that have ample non-volatile memory, such as laptops with large hard disks. However, for other devices it would generally require a considerable increase in size and cost.

There is therefore a need for an improved method of loading the essential software needed for normal operation of a device.

In addition to being turned on by a user manually operating a switch, some devices can turn on automatically. On example of this is that some mobile phones can turn on automatically when their alarm clock function is active and an alarm time is reached and/or the alarm is acknowledged rather than snoozed by a user. To achieve this such phones have—in addition to a main processing function that is used during normal operation of the phone—a background processing function that handles background processes whilst the phone is in its "off" state. The background function uses very little power compared to the main processing function. Operations handled by the background processing function include maintenance of a real-time clock, performance of alarm clock and reminder functions (at least whilst the phone is in its "off" state) and detection of external events that are to trigger the device to turn on, such as the pressing of an "on" button and connection to an external power supply.

SUMMARY

According to the present invention there is provided a battery-powered device comprising: a memory storing software essential to the provision of normal functions of the device; a first processing section comprising a data processor capable of executing the software, the device being capable of operating the first processing section in a normal mode in which it can execute the software and a low power mode; a second processing section having a clock for maintaining a time, and being capable of triggering behaviour of the device in response to the time of the clock preceding a user-set time by a pre-set advance interval; the device being configured to, in response to triggering by the second processing section when the first processing section is in the low power mode, cause the first processing section to enter the normal mode and to load the software According to a further aspect of the invention there is provided a method for operating a device comprising a memory storing software essential to the provision of normal functions of the device, a first processing section comprising a data processor capable of executing the software, the device being capable of operating the first processing section in a normal mode in which it can execute the software and a low power mode; and a second processing section having a clock for maintaining a time, and being capable of triggering behaviour of the device in response to the time of the clock preceding a user-set time by a pre-set advance interval; the method comprising: in response to triggering by the second processing section when the first processing section is in the low power mode, causing the first processing section to enter the normal mode and to load the software.

Preferably the pre-set advance interval is such as to allow the software to be loaded prior to the user-set time.

Preferably the software is at least part of an operating system of the device.

Preferably the first processing section comprises a data processor and a volatile memory for storing software when it has been loaded.

Preferably in the low power mode the processor receives insufficient power to operate normally. In the low power mode the processor uses less power than in the normal mode.

Preferably in the low power mode the volatile memory receives insufficient power to store software.

Preferably the device is a portable device.

In an alternative embodiment the device could be powered by means other than a battery, for example by mains electrical power.

Preferably the device comprises a communication interface for downloading data and a data store for storing a list of one or more user-set data locations, and wherein the device is configured to, in response to triggering by the second processing section download data from the or each user-set data location via the communication interface.

Preferably the pre-set advance interval is such as to allow the data to be downloaded prior to the user-set time.

Preferably the communication interface is capable of receiving the data by a wireless data link thereto.

Preferably the communication interface is capable of receiving the data by radio.

Preferably the device is a mobile phone and the communication interface is capable of communication with a mobile phone network for downloading the data.

Preferably the device comprises a memory for storing the downloaded data.

Preferably the device comprises a user interface for presenting the downloaded data to a user.

BRIEF DESCRIPTION OF THE DRAWINGS

The present invention will now be described with reference to the accompanying drawing.

In the drawing:

FIG. 1 is a schematic diagram of a communication terminal.

DETAILED DESCRIPTION

In a preferred embodiment of the present invention the communication terminal 1 is a mobile phone that offers an alarm clock facility. Whilst the phone is turned off the alarm clock facility is operated by a background function of the phone. When the alarm time set by the user is reached the background function can cause the phone to turn back on and the alarm to sound. In this invention the turning on of the phone is begun shortly before the alarm time so that there is time to load essential software of the phone (e.g. some or all of its operating system and associated variables) before the alarm time. This allows power to be saved when the device is turned off, and yet the device is fully functional at the alarm time.

The system shown in FIG. 1 will now be described in more detail.

The mobile phone 1 comprises a central processing unit 16, which controls the operation of the phone in accordance with software stored in a read only memory 13. The central processing unit is connected to a display 12 for displaying information to a user, a keypad 10 for obtaining input from a user, a loudspeaker 7 for outputting audio to be heard by the user and a microphone 8 for receiving audio from the user. The central processing unit contains random access memory (RAM) 2 that can be used for storing temporary data, as can an external RAM 3.

A background processing unit 5 can handle background processes whilst the phone is in its "off" state. The background function uses very little power compared to the main processing function 16. The background processing unit implements a real-time clock under the control of a crystal oscillator 6.

The mobile phone also has a communication subsystem 11 for communicating with a mobile telephony network. The communication subsystem comprises an antenna 15 and a communication engine 14. The communication engine 20 is connected between the antenna and the processor 10. The communication engine handles conversion between baseband and radio frequency and handles signalling communications with the wireless network. At least some functional elements of the communication engine may be implemented on a common chip with one or more parts of the central processing unit.

The processor has access to a non-volatile memory 4 for storing user settings.

The mobile phone is powered by a battery 12.

The mobile phone may be operable in accordance with any suitable communications protocol. Examples include GSM and 3G (UMTS).

When the phone is turned on by means of the user pressing a power on key on the keyboard 10 the phone starts by loading its essential software from ROM into working memory. That process typically includes configuring operating variables for use. Once that process is completed it can begin to provide functions to the user.

The user can configure the phone to turn on automatically, for example using an alarm clock function of the phone or by using a power saving function that automatically turns the phone off at a preset time of day and back on at another preset time. Such a power saving function would normally be set so as to turn the phone off automatically overnight. To operate either of these functions the user uses the keypad 10 to navigate a menu structure of the phone and then enters the desired on time and, for the power saving function, an off time. The phone stores the set on and off times in non-volatile memory 4 and compares those with the value of the real-time clock maintained by the background function 5. When the value of the real time clock matches the value stored for the on time (taking into account a pre-load offset interval as described below) the phone enters a turn-on routine. If the phone has been turned on by means of the alarm clock function then it also sounds an alarm at the set time.

The turn-on routine will now be described. First, the phone powers up the components such as processor 16 and RAM 3 that are required for normal operation. Preferably user interface devices such the display are not powered on at that time. Then the phone loads from ROM 13 the essential software that it requires for operation. Any essential working variables are configured and the variables and the software required for subsequent operations are stored in working memory. Typically this process will involve loading the operating system of the phone. When this load operation has been completed the phone is ready for normal operation. This operation takes some time, and so a pre-load offset interval is stored in the phone, for example in the non-volatile memory 4 or in the background function 5 which triggers the turn-on routine. The background function 5 is configured to initiate the turn-on routine at a time of the real-time clock that precedes the pre-set on time by the pre-load offset interval. The pre-load offset interval is set so that there is sufficient time to load the operating system before the turn-on time is reached. The result of this procedure is that the phone is ready for use immediately, for the provision of its full normal range of functions to a user, at the turn-on time.

The user may also configure the phone to load content data before turn-on. For example, the user may want the phone to load the latest news, weather or horoscopes (including text, image, video, audio and other data) so that he can view them when the phone turns on. The data could be loaded in any suitable form, but options include loading the data from websites or from RSS (RDF site summary) feeds. To activate this function the user uses the keypad 10 to navigate a menu structure of the phone and then enters the address(es) of the desired content data. The phone stores the addresses in non-volatile memory 4. The turn-on routine can then include the downloading of the content data from the defined addresses. This may be done after the essential software has been fully loaded, or may be done in parallel with the loading of some of the software if those parts of the software needed for downloading the content data have already been loaded. The content data can be downloaded via any suitable connection to the phone, but conveniently it can be downloaded by means of a connection to a network via the communication subsystem 11. For example, it could be downloaded by means of a circuit-switched or packet-switched connection to an internet gateway of a mobile phone network. Alternative types of connection include wireless LAN (local area network) and wired data connections. The pre-load offset time should take account of the time required to load the content data; thus the pre-load offset time should be set so that there is sufficient time to load the operating system and the content data before the turn-on time is reached. The user can then view the loaded data (using a suitable viewer application of the phone, for example a web browser) at the turn-on time.

In order to successfully set the pre-load offset time when the phone is to download content data during the turn-on routine, the phone should estimate the time that will be taken to download the data. It may do this based on the number of stored addresses and the type of data (if any) with which they are associated. It may also take into account how long downloads of data from those addresses have taken in the past. Similarly, the pre-load offset time allowed for loading of the essential software may be set rigidly, or may be adjusted depending on how long the loading has taken in the past. In the most basic embodiment, the offset time could be unalterably fixed at a time that is likely to be sufficient for loading the software and user data in most normal circumstances, e.g. 5 or 10 minutes.

If the turn-on routine is completed before the pre-set on time then some or all of the user interface devices (e.g. the display) preferably remain powered down until the on-time. This saves on battery power.

In an optional mode of operation, the phone may continue to load software and if necessary download content data when the pre-set alarm clock on time is reached, irrespective of whether or not the user presses a button to enter a snooze mode. This provides an advantage over prior art phones in which the essential software is not loaded until the user actually cancels the alarm.

In either mode, if the alarm is not cancelled or acknowledged within a pre-set period of time (e.g. 20 minutes) from the alarm on time then the phone is shut down and re-enters its sleep state.

If the turn-on routine is initiated but the phone does not have sufficient power to last until the next alarm, it automatically switches to the sleep state without loading the essential software in order to preserve power. Under the control of the background processing system it then reawakens at the alarm on time in order to sound the alarm. If the phone does not have sufficient power to last until the alarm goes off even in the off state then the user is warned that they need to charge the phone.

The present invention is not limited to use with mobile phones. It could be used with other (preferably battery-powered) devices. Non-limiting examples of such devices include personal digital assistants (PDAs) laptop computers, personal music players, radios etc.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A battery powered device comprising:
   a non-volatile memory configured to store software essential to the provision of normal functions of the device;
   a communication subsystem configured to communicate with a network;
   a first processing section configured to execute the software when the device is in a normal mode, and load the software into a working memory in response to a trigger;
   a second processing section coupled to a clock for maintaining a time, the second processing section configured to handle background processes when the device is in a low-power mode and initiate the trigger in response to the time of the clock preceding a user-set time by a pre-set advance interval, the pre-set advance interval taking into account a time required to download external content data via the communication subsystem, wherein the first processing section comprises a data processor, and the working memory comprises a volatile memory configured to store the software when it has been loaded and wherein in the low power mode the volatile memory receives insufficient power to store software.

2. The device as claimed in claim 1, wherein the preset advance interval is such as to allow the software to be loaded prior to the user-set time.

3. The device as claimed in claim 1, wherein the software is at least part of an operating system of the device.

4. The device as claimed in claim 1, wherein in the low power mode the processor receives insufficient power to operate normally.

5. The device as claimed in claim 1, wherein the device is a portable device.

6. The device as claimed in claim 1, wherein the communication subsystem comprises a communication interface configured to download the external content data and a data store configured to store a list of the one or more user-set addresses, and wherein the device is configured to, in response to triggering by the second processing section, download the external content data from the one or more user-set data addresses via the communication interface.

7. The device as claimed in claim 6, wherein the preset advance interval is such as to allow the external content data to be downloaded prior to the user-set time.

8. The device as claimed in claim 6, wherein the communication interface is configured to receive the data by a wireless data link thereto.

9. The device as claimed in claim 8, wherein the communication interface is configured to receive the data by radio.

10. The device as claimed in claim 9, wherein the device is a mobile phone and the communication interface is configured to communicate with a mobile phone network for downloading the data.

11. The device as claimed in claim 6, comprising a memory for storing the downloaded data.

12. The device as claimed in claim 1, comprising a user interface for presenting the downloaded data to a user.

13. A method for operating a device comprising a non-volatile memory storing software essential to the provision of normal functions of the device, a first processing section comprising a data processor configured to execute the software, the device being configured to operate the first processing section in a normal mode in which it can execute the software and a low power mode, wherein the device comprises a volatile memory configured to store the software when it has been loaded and wherein in the low power mode the volatile memory receives insufficient power to store software; and a second processing section having a clock for maintaining a time, and being configured to trigger behavior of the device in response to the time of the clock preceding a user-set time by a pre-set advance interval, the pre-set advance interval taking into account a time required to download external content data via a communication subsystem; the method comprising: in response to triggering by the second processing section when the first processing section is in the low power mode, causing the first processing section to load the software before entering the normal mode.

14. A method for operating a device, the method comprising:
   providing a non-volatile memory configured to store software essential to the provision of normal functions of the device;
   executing the software when the device is in a normal mode, and loading the software into a working memory in response to a trigger;
   processing background processes when the device is in a low-power mode; and
   initiating the trigger in response to a time of a clock preceding a user-set time by a pre-set advance interval, the pre-set advance interval taking into account a time required to download external content data from a network via a communication subsystem, wherein the working memory comprises a volatile memory configured to store the software when it has been loaded, and wherein in the low power mode the volatile memory receives insufficient power to store the software.

15. The method according to claim 14, further comprising setting the pre-set advance interval so as to allow the software to be loaded prior to the user-set time.

16. The method as claimed in claim 14, wherein the processing of background processes occurs when a data processor performing the processing receives insufficient power for normal operation.

17. The method as claimed in claim 14, wherein the loading of the software into the working memory comprises loading the software into a volatile memory, and wherein, in the low power mode, the volatile memory receives insufficient power to store the software.

18. The method as claimed in claim 14, further comprising:

downloading the external content data from the one or more user-set addresses in response to the trigger, said downloading occurring via a communication interface of the communication system.

19. The method as recited in claim 18, further comprising setting the pre-set advance interval so as to enable the external content data to be downloaded prior to the user-set time.

* * * * *

UNITED STATES PATENT AND TRADEMARK OFFICE
CERTIFICATE OF CORRECTION

| | | |
|---|---|---|
| PATENT NO. | : 8,761,711 B2 | Page 1 of 1 |
| APPLICATION NO. | : 11/664411 | |
| DATED | : June 24, 2014 | |
| INVENTOR(S) | : Grignani et al. | |

It is certified that error appears in the above-identified patent and that said Letters Patent is hereby corrected as shown below:

On the Title Page

Item (75), Inventors, Line 3, "Setagama Ku" should read --Setagaya Ku--.

In the Specification

Column 2, line 6, "software" should read --software.--

Signed and Sealed this
Twenty-fourth Day of March, 2015

Michelle K. Lee
*Director of the United States Patent and Trademark Office*